United States Patent [19]
Black et al.

[11] Patent Number: 5,345,495
[45] Date of Patent: Sep. 6, 1994

[54] DATA DIAGNOSTICS WITH LEDS ON THE FACE OF A TELEPHONE

[75] Inventors: David C. Black; Tave P. Dunn; Elie A. Jreij, all of Austin; Gary R. Key, Round Rock; William E. Levene; Timothy L. Wilson, both of Austin, all of Tex.

[73] Assignee: ROLM Company, Santa Clara, Calif.

[21] Appl. No.: 936,969

[22] Filed: Aug. 28, 1992

[51] Int. Cl.⁵ .............................................. H04M 1/24
[52] U.S. Cl. ........................................ 379/29; 379/34; 379/1; 379/396
[58] Field of Search ................... 379/29, 28, 387, 360, 379/396, 34, 1; 375/10

[56] References Cited

U.S. PATENT DOCUMENTS

| | | |
|---|---|---|
| 4,498,186 | 2/1985 | Hwang et al. ................ 379/28 X |
| 4,554,410 | 11/1985 | Furumoto ....................... 379/27 |
| 4,995,070 | 2/1991 | Shin ................................. 379/27 |
| 5,062,131 | 10/1991 | Kanare et al. ................ 379/27 X |

OTHER PUBLICATIONS

"Smart phone aren't coming they're here", William Krepick, Feb. 26, 1979.

*Primary Examiner*—Stephen Chin
*Assistant Examiner*—Paul Loomis

[57] ABSTRACT

A telephone includes means for switching the LEDs, on the face of the phone, between a normal operating mode in which the lights indicate the status of telephony features, such as mute or hold, to a diagnostic operating mode in which the LEDs indicate the status of the telephone's data communications signals. The modes are toggled by entry of a code on the telephone keypad or by way of a command from a workstation coupled to the telephone by way of a data communications port.

12 Claims, 5 Drawing Sheets

DATA DIAGNOSTICS WITH LEDS ON THE FACE OF A TELEPHONE

BACKGROUND OF THE INVENTION

A. Field of the Invention

This invention relates to telephone equipment and related diagnostic features.

B. Related Art

Conventional digital telephones will sometimes include one or more data communications ports. Such data communications ports will typically include signal lines for transmitted data, received data and one or more control signals such as data terminal ready (DTR). In some of these telephones, such as the ROLMphone 244PC, the status of data communications signals is displayed by dedicated light emitting diodes (LEDs) located on the back of the telephone, in proximity to the physical data communications connector.

An example of such a telephone is illustrated in FIG. 1. The telephone 100 of FIG. 1 includes a plurality of keys 102A–J. For each of the keys 102 A–J there is a corresponding adjacently located LED 104 A–J. The telephone of FIG. 1 is also provided with volume control keys 106, 108 (which have no corresponding LEDs), a handset 110, a liquid crystal display 112, and a telephone keypad 114. A RS-232 data communications port 116 and a telephone network port 118 (for connection to a branch exchange system) are provided at the rear of the telephone.

A rear view of the telephone of FIG. 1 is illustrated in FIG. 2. As will be observed from FIG. 2, the telephone includes a power input connector 202, and a row of LEDs 204 which indicate whether the telephone has adequate power and the status of a subset of the data communications lines on the data communications port 116. For example, the LEDs 204 may indicate, from left to right, the status of DTR, transmitted data (Tx), received data (Rx) and the power supply.

A problem with having the diagnostic LEDs at the rear of the telephone is that they can be awkward to use. For example, movement of the telephone to view the diagnostic LEDs can cause entanglement or disconnection of data communications, telephony and power cables attached to the telephone at the rear. The action of moving the phone can also cause the cables to interfere with other items on the desk on which the telephone sits. Further, the fact that the LEDs are dedicated to diagnostics, but only occasionally viewed by the user, results in unnecessary cost in parts and manufacturing.

SUMMARY OF THE INVENTION

In light of the above, there is provided a telephone, including: a telephone face having keypad and a plurality of indicators; telephony line interface means for connecting the telephone to a telephony line; a data communications port; and, control means, coupled to the keypad and the indicators, for causing at least some of the indicators to indicate the status of signals on any of the telephony line or the data communications port responsive to a command from a telephone user.

BRIEF DESCRIPTION OF THE DRAWINGS

The present invention will be better understood by reference to the drawing, wherein.

Like reference numerals appearing in more than one figure represent like elements.

DETAILED DESCRIPTION OF THE PREFERRED EMBODIMENTS

Figure 5:
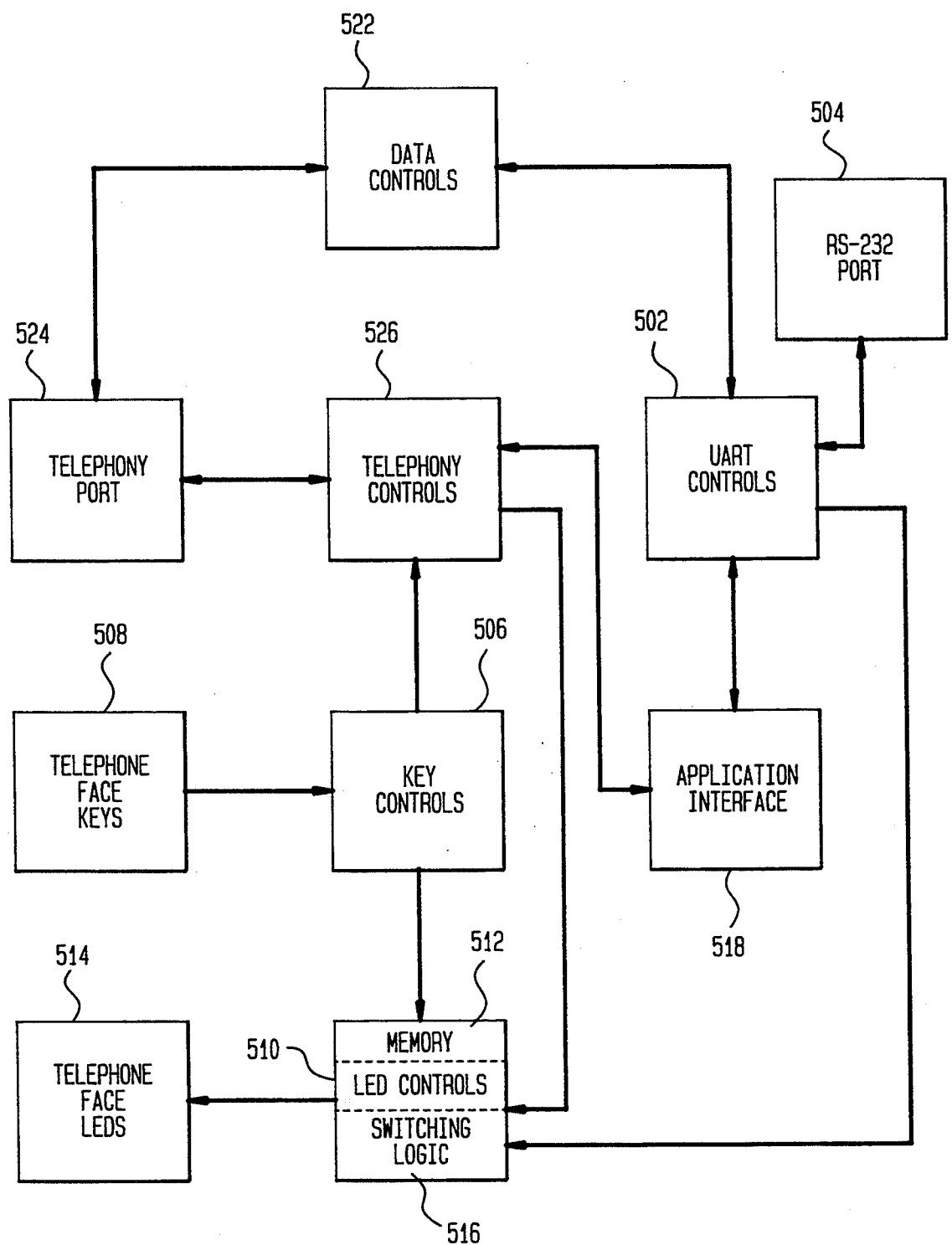
FIG. 5 is a functional block diagram of a telephone according to an embodiment of the present invention.

A functional block diagram of telephone logic embodying the present invention is shown in FIG. 5. A UART control block 502 controls data communications to and from an RS-232 port 504 and the remainder of the telephone. More particularly, the UART control block handles the transfer of data and monitors the RS-232 data communications signals such as transmitted data (Tx), received data (Rx) and RS-232 control signals (e.g. Data Terminal Ready (DTR), Data Set Ready (DSR) and Request to Send (RTS)).

The Key Control Block (KCB) 506 monitors depression of keys 508 on the telephone's face. The key control block also monitors the keys to check for the entry of commands that will cause the telephone to enter or exit data diagnostics mode. When keyboard entry of either the "enter data diagnostic mode" command sequence (*#DATA*#) or the "exit data diagnostic mode" command sequence (*#EXIT*#) has been recognized by the KCB 506, the KCB passes a message to the LED control block (LCB) 510 to either enter or exit the data diagnostic mode accordingly.

The LCB 510 includes a memory 512 for storing the current state of the LEDs 514 and logic 516 for switching the LEDs between the telephony mode (in which normal telephony functions are displayed) and data diagnostic mode (in which the LEDs represent the states of signals on the RS-232 port). When the phone is in data diagnostic mode, the LCB receives information from the UART controls 502 that reflects Rx, Tx and the RS-232 control signals.

In addition to passing data activity information to the LCB, the UART control block 502 also transfers received and transmitted characters to and from the Application Interface (API) 518. The API receives this information when the phone is in command mode, and it communicates with the telephony control block 520 to exchange information. When the phone is in data transfer mode (transparent mode), the UART control block passes data to the data control block (DCB) 522, which provides a data interface to the telephony port 524.

Telephony control information from the PBX (received via the telephony port 524) is processed by a telephony control block 526. One function of the telephony control block 526 is to translate cadence commands received from a PBX (by way of the telephony port 524) into LED control information. The LED control information is, in turn, passed to the LED control block 510. The LED control block 510 then controls the physical LEDs in accordance with the selected mode of operation.

Figure 1:
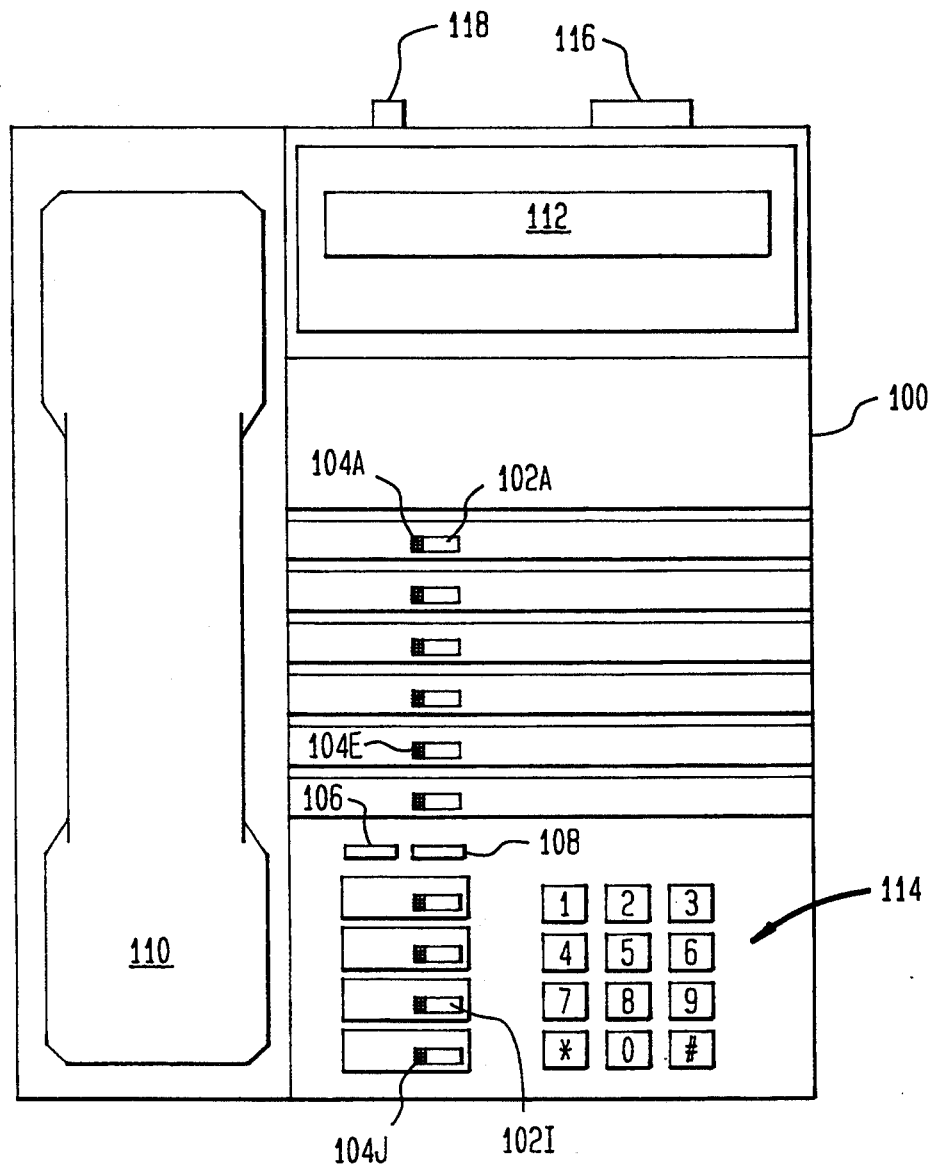
FIG. 1 is an illustration of a telephone of a type suitable for an embodiment of the present invention.
Figure 2:
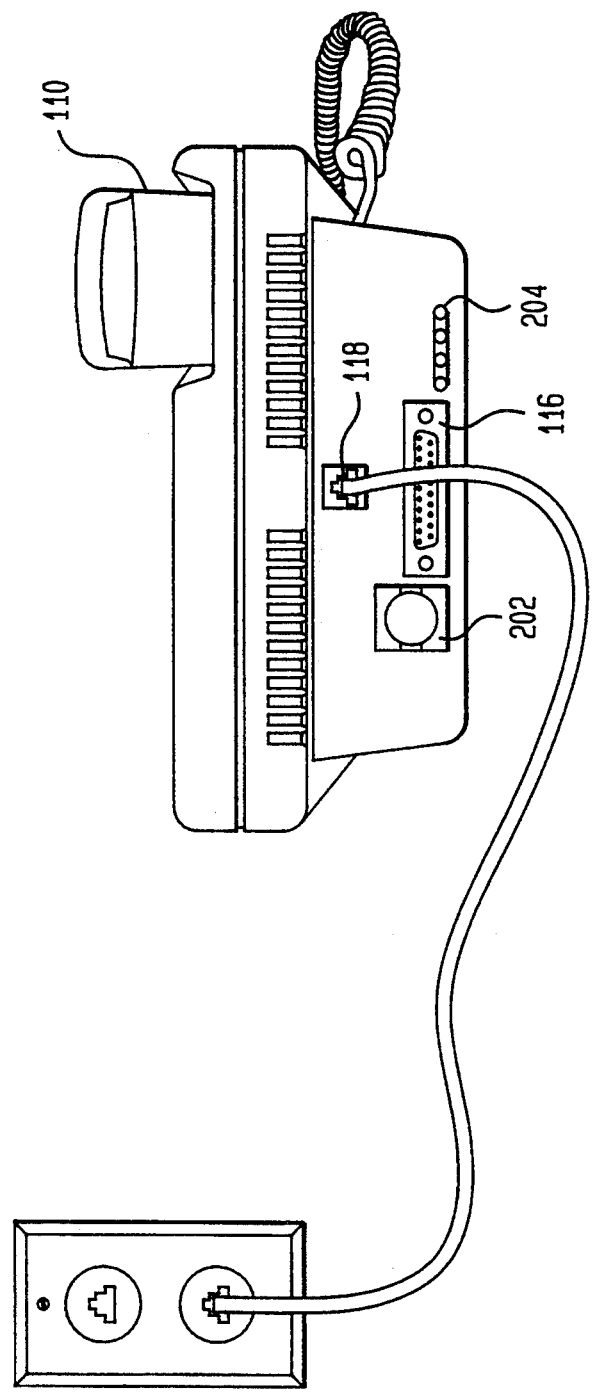
FIG. 2 is a rear view of the telephone of FIG. 1.
Figure 3:
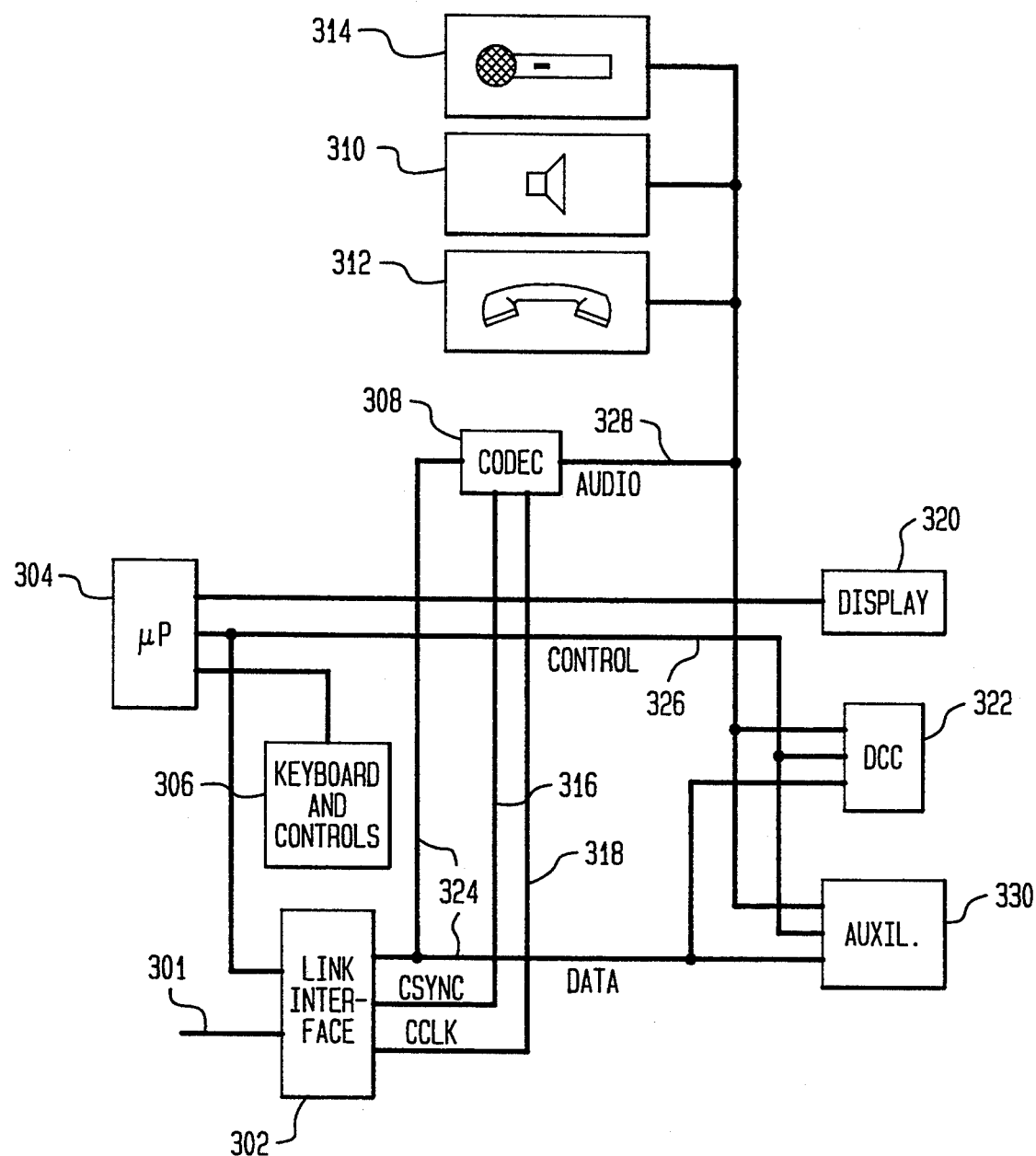
FIG. 3 is a diagram of internal telephone logic according to an embodiment of the present invention; and, FIG. 4 is a more detailed diagram of the DCC of FIG. 3.

A more detailed diagram of an improved telephone according to an embodiment of the present invention is illustrated schematically in FIG. 3. The digital telephone is coupled to a Private Branch Exchange (PBX) by way of a network interface 302. The network interface 302 translates the network protocol (e.g. ROLMlink or ISDN) to the protocol of the telephone's internal data and control busses 324, 326 and handles transfers of telephone control information between a microprocessor 304 and the telephony line 301. The microprocessor 304, is connected to the network interface 302. The microprocessor 304 controls all of the telephone functions, and is the source and destination for all communications with the PBX. Also connected to the network interface and the microprocessor is a keyboard and associated control logic 306. The keyboard/controls 306 include the telephone keys, light emitting diodes (LEDs) and the associated control circuitry.

A coder/decoder (CODEC) 308 is connected to receive data output from the network interface 302. The CODEC 308 converts digital audio information into analog form to drive a speaker 310 and/or handset 312, and converts the analog information from a microphone 314 and/or the handset 312 to digital information destined for the network switch. The CODEC 308 is also connected to receive two clock signals from the network interface. The first of these signals, the CODEC sync (CSYNC) 316, tells the CODEC when to read a field in a data bus frame. The second, the CODEC clock (CCLK) 318, is a bit clock which runs at the bit transmission rate of the internal bus.

A digital LCD display 320 is also connected to the microprocessor 304. The display 320 is used to display data such as the number dialed, stored telephone numbers and other data provided by way of the microprocessor 304.

A data communications controller (DCC) 322, controlled by the microprocessor 304, provides the telephone with two RS-232 data communications ports. The DCC 322 is connected to the network interface 302 and the microprocessor 304. Although signals from the CODEC 308 are made available at the DCC interface, they are not used by the DCC 322. When a data connection is active, data from an optionally connected RS-232 device flows through the telephone and ROLMlink to the switch, from which it flows to another line or device.

The control bus 326 is the path for phone control information which is sourced by the microprocessor. An audio bus 328 carries analog audio information and provides an analog path to and from the CODEC 308.

Optionally, an auxiliary processing apparatus 330 can be provided. The auxiliary processing apparatus 330 is connected to the network interface 302 and the microprocessor 304 and may also be connected to the CODEC 308. The data communications controller 322 and the auxiliary processing apparatus 330 can be of a "plug in" type which is installable by the user.

Figure 4:
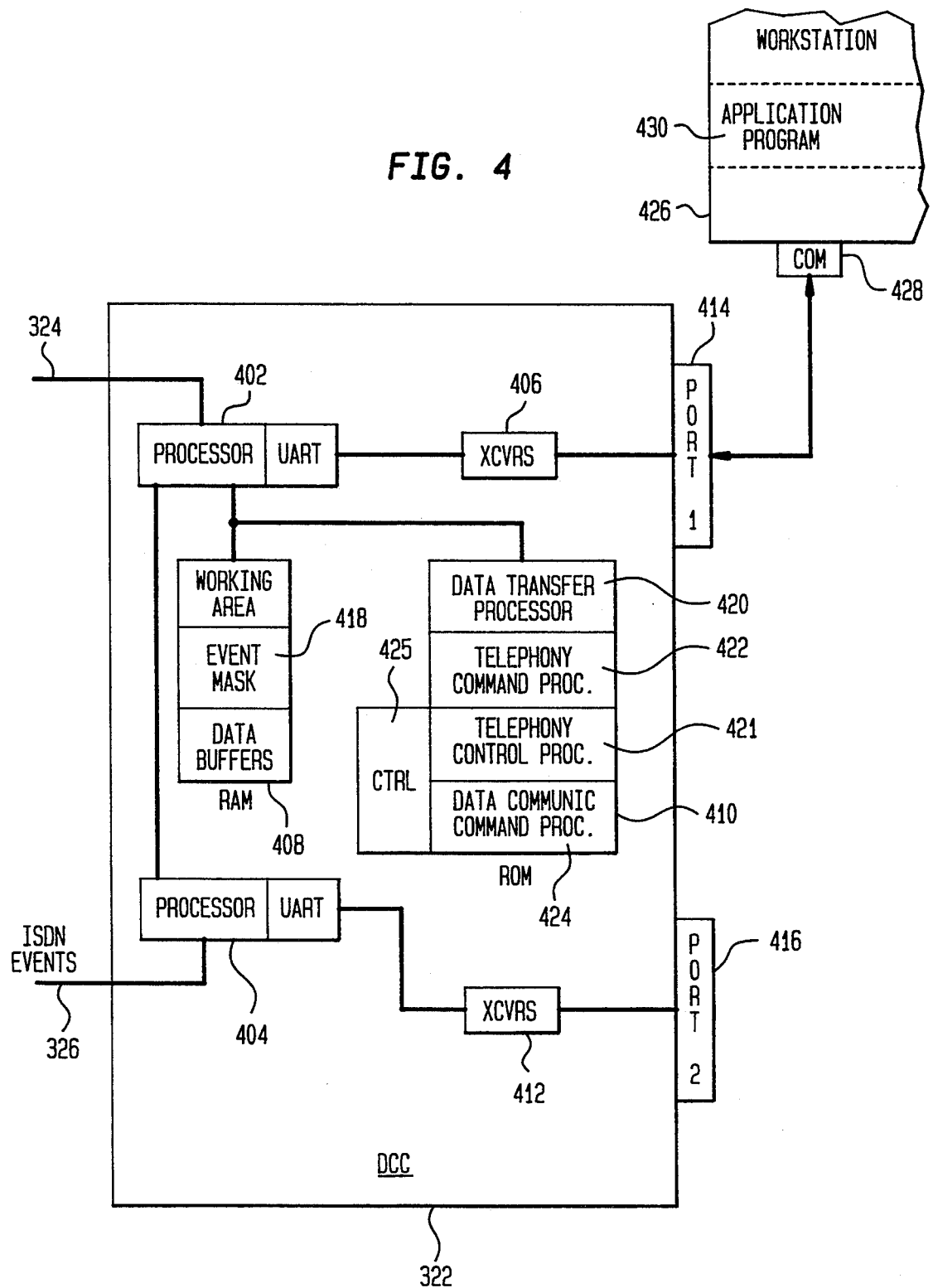

A more detailed view of the data communications controller 322 is illustrated in FIG. 4. The DCC 322 includes two microprocessors 402, 404, each of which includes an internal UART (Universal Asynchronous Receiver/Transmitter). The primary microprocessor 402 (a Motorola 68302) is connected to the telephone's internal data bus 324, the secondary microprocessor 404, a set of RS-232 transceivers 406, a random access memory (RAM) 408 and a read only memory (ROM) 410. The secondary microprocessor 404 (a Motorola 6805) is connected to the primary microprocessor 402, the control bus 326 and a second set of transceivers 412. The transceivers 406, 412 are, in turn, respectively connected to a first RS-232 port (PORT1) 414 and a second RS-232 port (PORT2) 416.

The secondary microprocessor serves as a conduit between the primary microprocessor 402, and the control bus 326 and second RS-232 port 416. The secondary microprocessor includes internal code to pass ISDN call status events (received from the network via the control bus 326) to the primary microprocessor 402 and to pass commands and responses between the second communications port 416 and the primary microprocessor 402.

The RAM 408 provides workspace for the primary microprocessor and includes a data buffer area for the RS-232 ports. The ROM 410 includes a number of programs (subroutines or processes) which are executed by the primary microprocessor 402. These processes include a data transfer processor 420, a telephony control processor 421, a telephony command processor 422 and a data communications command processor 424.

The data transfer processor 420 is a timer driven interrupt routine. The timer (which is internal to the primary microprocessor) runs at a sufficient rate to handle the necessary data transfer speeds on the RS-232 ports and the telephony link. The data communications command processor 424 and the telephony control processor 421 run in a main control loop 425, each processing one piece of information if any is present and then passing control to the next process. The data communications command processor 424 calls the telephony command processor 422 whenever a user enters a telephony command set (described in more detail later).

The data transfer processor 420 handles normal data transfers between the data bus 324 and the RS-232 communications ports 414, 416. The data transfer processor 420 also includes code for processing the escape sequence which enables a user or applications program, connected via an RS-232 port, to change the DCC from transparent mode (controlled by the data transfer processor) to command mode (controlled by either the telephony command processor or the data communications command processor).

The data communications command processor 424 handles data communications commands of the type well known in the art. The commands are sent by a connected apparatus (e.g. a workstation) via an RS-232 port. On power up, the DCC defaults to command mode and the data communications command processor 424. The data communications command processor controls the DCC in response to commands in accordance with the conventional "AT" command set, with extensions for activating the telephony command processor(s).

The telephony control processor 421 handles the telephony protocol that is received from the telephony network link. It interprets and responds to telephony commands such as LED cadence commands and ISDN call status events. In addition, the telephony control processor 421 sends information from the telephone to the link, such as information resulting from key depressions.

The telephone keyboard monitoring function can be embodied in a number of different ways. For example, depressions of the keys (detected by the keyboard and controls 306) can be monitored by a keyboard control process within the telephony control processor 421 itself. As an alternative, a separate processor can be provided to monitor the key depressions detected by the keyboard and controls 306. In any event, the keyboard control process (along with the keyboard controls) will provide the function of block 506 of FIG. 5.

The telephony command processor 422 handles telephony commands. Like the data communications commands, the telephony commands are sent by a connected apparatus via an RS-232 port. Once in command mode, a user can activate the telephony command processor set by keying the proper AT command sequence (e.g. AT%U). The telephony command processor can include more than one telephony command set, each of which can be entered by way of a distinct AT command.

A computer workstation 426 can be coupled to either of the DCC's communications ports 414, 416 by way of its own RS-232 data communication port 428. An application program 430, executing on the workstation 426, can send commands and data to the DCC 322 via the workstation's RS-232 port 428.

Data diagnostics are invoked either via a keystroke sequence on the telephone keypad 114 or by reception of a dedicated command sequence on one of the DCC's RS-232 ports.

The keyboard control process monitors key depressions by the user (passed through from the keyboard and controls 306). When the user presses the key sequence for data monitoring (*#3282#* or *#DATA*#) the LEDs on the phone immediately change state. The bottom four LEDs (LEDs 104G-J) turn on solid to indicate to the user that the telephone is in diagnostic mode. Therefore, the user can easily determine that he is in diagnostics mode by looking at the phone. LEDs which are not used for diagnostic mode are turned off.

Diagnostic mode is exited by depression of a second keypad sequence (*#3948*# or *#EXIT*#). In response, the keyboard/control logic returns the LEDs to their normal function and includes any updates which were received during diagnostics mode. These updates are stored in the RAM 408 by the telephony control processor 421.

Alternatively, diagnostic mode can be entered or exited by way of reception of the above described character sequences by the telephone via one of the data communication ports. In this case the appropriate character sequence, which is added to the telephone's conventional telephony command set, is transmitted to the telephone via a data communication port on the DCC.

The diagnostics check the interface with the outside world (from the DCC point of view) and report their results to the LEDs on the telephones face. When the DCC is in diagnostic mode, all system or local LEDs are turned off and the following mapping is used for the data communications signals:

| RS-232 Signal | | LED Number |
| --- | --- | --- |
| TxD1 | (port 1) | 104B |
| RxD1 | (port 1) | 104C |
| DTR | (port 1) | 104D |
| TxD2 | (port 2) | 104E |
| RxD2 | (port 2) | 104F |

The DTR LED is turned on when the DTR signal is asserted, otherwise it is turned off.

The data transfer processor 420 monitors the TxD1, RxD1, TxD2 and RxD2 lines in 200 millisecond blocks of time. The TxD1 and TxD2 LEDs are set to flicker for 200 milliseconds when there is activity on the associated transmit line during a given block of time, and are turned off for 200 milliseconds when no activity has been detected on the associated transmit during the associated time block.

Similar to the TxD1 and TxD2 LEDs, the RxD1 and RxD2 LEDs are set to flicker for 200 milliseconds when there is activity on the associated transmit line during a given block of time, and are turned off for 200 milliseconds when no activity has been detected on the associated transmit during the associated time block.

While the flickering of the LEDs will not reflect the actual flow of data, it will provide an indicator of the density of data traffic on each of the TxD and RxD lines.

When the DCC is in data diagnostics mode, LEDs 104G-J are turned on. Additionally, LED 104A is turned on when the telephone is running a stimulus telephony protocol and off when the telephone is running a functional telephony protocol.

The LEDs are all returned to their original cadences when the user exits the diagnostics mode.

Now that the invention has been described by way of the preferred embodiment, various enhancements and improvements which do not depart from the scope and spirit of the invention will become apparent to those of skill in the art. Thus it should be understood that the preferred embodiment has been provided by way of example and not by way of limitation. The scope of the invention is defined by the appended claims.

We claim:

1. A telephone, comprising: a telephone face having a keypad and a plurality of indicators; telephony line interface means for connecting the telephone to a telephony line; a data communications port; and, control means, coupled to the keypad and the indicators, for causing the telephone to be placed in any of a normal mode, in which the status of signals on the telephony line is indicated by at least some of the indicators, and a diagnostic mode, in which the status of signals on the data communications port is indicated by at least some of the indicators, the control means being operable in response to a command from a user.

2. The telephone of claim 1 wherein the control means comprises detection means for detecting reception of a first sequence of characters by the data communications port; and, switch means, coupled to the detection means, causing the telephone to change between the normal mode and the diagnostic mode in response to reception of the first sequence of characters.

3. The telephone of claim 1 wherein the control means comprises means for detecting depression of a first sequence of keys on the keypad and switch means, coupled to the detection means, causing the telephone to change between the normal mode and the diagnostic mode in response to depression of the first sequence of keys.

4. The telephone of claim 1 wherein the control means comprises detection means for detecting reception of a predetermined indication from any of the keypad and the data communications port; and, switch means, coupled to the detection means, causing the telephone to change between the normal mode and the diagnostic mode in response to detection of the predetermined indication.

5. The telephone of claim 1 wherein the diagnostic mode comprises a plurality of selectable submodes in which the status of different sets of signals on the data communications port are indicated.

6. The telephone of claim 1 wherein the telephone comprises a plurality of data communications ports and wherein the diagnostic mode comprises a plurality of selectable submodes in which the status of signals on each of the data communications ports are separately indicated.

7. The telephone of claim 1 further comprising mode indication means, coupled to at least one of the indicators, for causing the at least one of the indicators to be continuously activated when the telephone is in the diagnostic mode.

8. The telephone of claim 1 further comprising: means for storing indicator control commands arriving on the telephony line while the telephone is in the diagnostic mode and for operating the indicators in accordance with the indicator control commands when the telephone is switched from diagnostic mode to normal mode.

9. The telephone of claim 1 wherein the indicators are lights.

10. The telephone of claim 1 wherein data traffic density on the data communications port is indicated by cadence of at least one of the indicators when the telephone is in diagnostic mode.

11. The telephone of claim 3 wherein the first sequence of keys is a mnemonic indicative of the diagnostic mode.

12. A telephone, comprising:
a telephone face having a keypad and a plurality of visual indicators;
telephony line interface means for connecting the telephone to a telephony line;
data communications interface means for connecting the telephone to at least one digital data communications link; and,
control means, coupled to the keypad and the indicators, for causing the telephone to be placed in any of a normal mode, in which the status of signals on the telephony line is indicated by at least some of the indicators, and a diagnostic mode, in which the status of signals on the data communications link is shown by at least some of the indicators, the control means being operable in response to a command from the keypad;
storage means for storing indicator control commands arriving on the telephony line while the telephone is in the diagnostic mode;
wherein when the telephone is switched from diagnostic mode to normal mode, the control means operates the indicators in accordance with the indicator control commands received while the telephone was in diagnostic mode.

* * * * *